United States Patent
Rettig et al.

(10) Patent No.: US 10,914,699 B2
(45) Date of Patent: Feb. 9, 2021

(54) GAS SENSOR (71) Applicant: Robert Bosch GmbH, Stuttgart (DE)

(72) Inventors: Frank Rettig, Reutlingen (DE); Tobias Sebastian Frey, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 164 days.

(21) Appl. No.: 16/096,055

(22) PCT Filed: Apr. 26, 2017

(86) PCT No.: PCT/EP2017/059871
§ 371 (c)(1),
(2) Date: Oct. 24, 2018

(87) PCT Pub. No.: WO2017/186766
PCT Pub. Date: Nov. 2, 2017

(65) Prior Publication Data
US 2019/0128831 A1 May 2, 2019

(30) Foreign Application Priority Data
Apr. 28, 2016 (DE) .................. 10 2016 207 252

(51) Int. Cl.
G01N 27/12 (2006.01)
(52) U.S. Cl.
CPC ........... *G01N 27/128* (2013.01); *G01N 27/12* (2013.01)
(58) Field of Classification Search
CPC .............................. G01N 27/128; G01N 27/12
USPC ........................................................... 73/31.5
See application file for complete search history.

(56) References Cited

U.S. PATENT DOCUMENTS

| 3,983,527 | A | * | 9/1976 | Ohsato | ................. G01N 27/121 338/35 |
| 7,189,360 | B1 | | 3/2007 | Ho | |
| 2005/0050944 | A1 | | 3/2005 | Ha et al. | |
| 2013/0146865 | A1 | * | 6/2013 | Jang | ....................... B82Y 40/00 257/43 |

FOREIGN PATENT DOCUMENTS

| EP | 2533037 A1 | 12/2012 |
| EP | 2713157 A1 | 4/2014 |
| JP | S52133295 A | 11/1977 |
| JP | S60115837 A | 6/1985 |
| JP | H0755743 A | 3/1995 |
| WO | 2008009980 A1 | 1/2008 |

OTHER PUBLICATIONS

International Search Report for PCT/EP2017/059871, dated Jun. 20, 2017.

* cited by examiner

*Primary Examiner* — Tarun Sinha
(74) *Attorney, Agent, or Firm* — Norton Rose Fulbright US LLP; Gerard Messina (57) ABSTRACT

A gas sensor is described that includes a planar carrier membrane; a gas-sensitive layer on the carrier membrane; a first and at least a second electrode, which each lie on the gas-sensitive layer in an electrically conductive manner; and a first electric supply line to the first electrode and a second electric supply line to the second electrode. The second electrode lies radially outside the first electrode, and the first supply line is insulated with respect to the gas-sensitive layer.

9 Claims, 6 Drawing Sheets

GAS SENSOR

FIELD OF THE INVENTION

The present invention relates to a gas sensor. In particular, the present invention relates to a micromechanical gas sensor.

BACKGROUND INFORMATION

A gas sensor includes a gas-sensitive layer which lies between two conductor structures on a carrier membrane. The carrier membrane may be heated in order to bring the gas-sensitive layer to a predetermined temperature. The sensitivity, the selectivity, or the response time of the gas-sensitive layer with respect to different substances may be adjusted via the temperature. Typical temperatures may lie in the range from approximately 200° C. to 800° C. In order to avoid the situation in which different sections of the gas-sensitive layer have different temperatures in the area of the conductor structures, and to reduce an energy consumption by the gas sensor, attempts are made to build the gas sensor as small as possible. A micromechanical gas sensor may get by with a heat output of a few mW in order to reach a temperature of approximately 400° C. In this case, the conductor structures and the gas-sensitive layer are situated on a carrier membrane which is thermally insulated by way of the fact that it is usually stretched over a cavity.

Typical semiconductor-related methods are utilized for manufacturing the gas sensor, in particular lithography, which allows for the formation of highly precise structures. The gas-sensitive layer is usually applied as a fluid or a paste-like compound, however; surface properties of the carrier membrane, the viscosity of the applied substance, the metering accuracy during the application, the drying process of the substance, or the time between the application of the substance and the drying may have an influence on the shape and size of the gas-sensitive layer on the carrier membrane. In the case of a typical arrangement of conductor structures on the carrier membrane, however, the size and position of the gas-sensitive layer may have an influence on the electrically effective area of the gas-sensitive layer with respect to the conductor structures. The object of the present invention, therefore, is to provide a gas sensor and a manufacturing method, so that the gas sensor has a reduced extent of inaccuracies in the shape, size, or position of the gas-sensitive layer. During the manufacture of the micromechanical gas sensor, an inaccuracy in the positioning or extension of the gas-sensitive layer may have no influence on decisive characteristics of the gas sensor. These characteristics may include, in particular, a sensitivity, a selectivity, or a response time with respect to a predetermined substance.

SUMMARY

One possible embodiment of a gas sensor includes a planar carrier membrane; a gas-sensitive layer on the carrier membrane; a first and at least a second electrode, which each lie on the gas-sensitive layer in an electrically conductive manner; and a first electric supply line to the first electrode and a second electric supply line to the second electrode. The second electrode lies radially outside the first electrode, and the first supply line is insulated with respect to the gas-sensitive layer.

As a result, the situation may be prevented, in which a portion of the gas-sensitive layer lying outside the second electrode lies between the electrodes or supply lines in an electrically effective manner. The size and position of the gas-sensitive layer on the radial outer side of the second electrode play practically no role any longer for the electrical behavior of the gas-sensitive layer with respect to the electrodes.

An axis extending through the first electrode, which is perpendicular to the plane of the carrier membrane, may be referred to in order to consider the relative position of the electrodes with respect to each other. With respect to this axis, the second electrode is to always lie further away than an outer boundary of the first electrode. A conductor structure of the gas sensor is referred to as an electrode and, otherwise, a supply line, in an area in which the conductor structure is in contact with the gas-sensitive layer. In one specific embodiment, the supply line to the second electrode is arbitrarily short, so that the supply line is practically omitted.

The electrodes may also be formed in such a way that a convex area is defined in the plane of the carrier membrane, the first electrode being limited to the inside of the area and the second electrode lying on at least three sides of the outer side. As a result, it is ensured that the second electrode encloses the first electrode at least in a U-shape and, in this way, ensures that one area of the gas-sensitive layer lying on the outside of the second electrode is not electrically effective or is negligibly electrically effective with respect to the electrodes or supply lines.

The shapes of the two electrodes may be arbitrarily selected, provided the described relationship between the first, inner electrode and the second, outer electrode is ensured. In one further specific embodiment, the second electrode encloses the first electrode in the plane of the carrier membrane by an angle of at least 270°. In this case, the second electrode may have, for example, a polygonal or elliptical shape. In yet one further specific embodiment, the second electrode encloses the first electrode by an even greater angle which may be increased up to a full angle. If the second electrode encloses the first electrode in this way, the area of the gas-sensitive layer lying radially outside the second electrode may be electrically practically completely deactivated. Due to the enclosing shape of the second electrode with respect to the first electrode, the area of the gas-sensitive layer effectively lying between the electrodes may be essentially limited to the inner area of the second electrode. As a result, properties of the gas sensor may be controlled independently of a position or size of the gas-sensitive layer outside the second electrode.

In yet one further specific embodiment, the first electrode lies radially outside one further second electrode. In this way, the first and the second electrodes may be radially nested. The radially outermost electrode may ensure, in this case, that the sought extensive independence of position or size of the gas-sensitive layer is maintained. The nesting may also be cascaded, so that a multiply nested, concentric arrangement of the electrodes results.

In one further specific embodiment, the first and the second electrodes are interlocked in a comb-like manner on the radial inner side of the second electrode. In this specific embodiment, sections of the second electrode may lie within the aforementioned convex area which completely encloses the first electrode. Nevertheless, it is preferred that the second electrode encloses a preferably large section of the outer side of the convex area.

The first electrode may be separated from one of the second electrodes, at some points, by an insulation. In particular, the insulation may act in the vertical direction with respect to a surface of the carrier membrane, so that the electrodes lie at different vertical distances from the carrier membrane in the area of the insulation. The insulation may include, in particular, an insulating semiconductor material such as silicon dioxide.

In one further specific embodiment, a supply line of one electrode may also be separated from the gas-sensitive layer with the aid of an insulation. In this case, the insulation may act preferably, in particular, in the vertical direction as described above.

A method for manufacturing a gas sensor such as the above-described gas sensor includes steps of providing a planar carrier membrane; applying a first and a second conductor structure; applying an insulation of a section of the first conductor structure, so that the second conductor structure lies radially outside an uninsulated section of the first conductor structure, and applying a gas-sensitive layer onto the carrier membrane in the area of the uninsulated conductor structures.

Due to the insulation of a section of one of the conductor structures, the above-described function of a supply line results. In contrast thereto, an uninsulated section of a conductor structure, which is in contact with the gas-sensitive layer, is an electrode. Advantageously, relatively large tolerances with respect to size, position, or alignment of the gas-sensitive layer may be accepted. It should be ensured, however, that the area lying radially between the two electrodes lies preferably completely in the area of the gas-sensitive layer.

DETAILED DESCRIPTION

Figure 1:
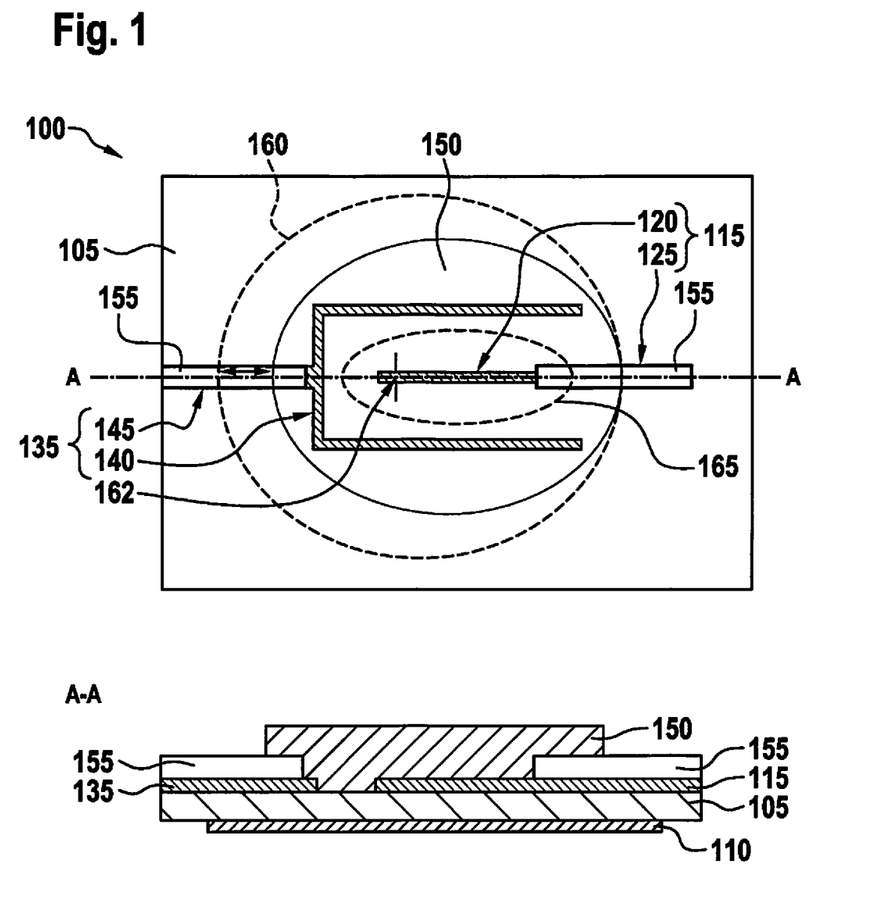
FIG. 1 shows a gas sensor.

FIG. 1 shows a gas sensor 100. A top view is represented in the upper area and a longitudinal section of gas sensor 100 is represented therebelow. Gas sensor 100 is preferably micromechanically manufacturable and is configured for detecting a gas or measuring the concentration of a gas. For this purpose, gas sensor 100 includes a carrier membrane 105 which may be carved out, for example, of a semiconductor substrate, and, in one preferred specific embodiment, extends over a thermally insulating cavity. A heating unit 110 is preferably provided on the carrier membrane 105, which may convert current into heat, for example, in the manner of an ohmic resistor, so that carrier membrane 105 is heated. In addition, a first conductor structure 115 including a first electrode 120 and a first supply line 125, as well as a second conductor structure 135 including a second electrode 140 and a second supply line 145 are mounted on the carrier membrane 105. A section of a conductor structure 115, 135, which is in electrical contact with gas-sensitive layer 150, is referred to as electrode 120, 140. Provided in the area of electrodes 120, 140 is a gas-sensitive layer 150 which preferably includes a metal oxide layer, for example, may include $SnO_2$, $WO_3$, $Ga_2O_3$, $TiO_2$ or $Cr_2O_3$. An insulation 155 may include, for example, silicon dioxide ($SiO_2$). A section of a conductor structure 115, 135 which does not contact gas-sensitive layer 150, in particular, because it is electrically insulated therefrom with the aid of insulation 155, is referred to as supply line 125, 145. Insulation 155 represented on the left, which subdivides second conductor structure 135 into second electrode 140 and second supply line 145, may also be omitted, so that second supply line 145 has a length of zero and, therefore, is practically dispensed with.

Gas-sensitive layer 150 is typically applied onto carrier membrane 105 with the aid of a dispensing, print, or jet-printing method. While, in particular, conductor structures 115, 135 may be formed with high geometric precision, the process of applying gas-sensitive layer 150 is frequently subject to relatively great inaccuracy. For example, the size of gas-sensitive layer 150 may vary between the represented size and a maximum size 160. The shape and alignment of gas-sensitive layer 150 may also vary within predetermined ranges.

It is provided to situate electrodes 120, 140 on carrier membrane 105 in such a way that a section of gas-sensitive layer 150, which lies within a variance range (in the representation from FIG. 1, the range between gas-sensitive layer 150 and maximum size 160) has practically no influence on an electrical measurement with respect to electrodes 120, 140. In this case, gas-sensitive layer 150 may change its resistance depending on a predetermined, gaseous substance or another effect may result on gas-sensitive layer 150, which may be sampled with the aid of electrodes 120, 140, for example, the change of a complex resistance, a voltage, a current, a thermos voltage, or a Hall voltage. Electrodes 120, 140 are preferably metallic, although they may also include mixed-conductive or ion-conductive materials.

It is preferred that second electrode 140 lies radially outside first electrode 120. For this purpose, an axis 162 may be defined, which extends through first electrode 120, perpendicular to the plane of carrier membrane 105. For all axes 162 which may be defined in this way, an outer boundary of first electrode 120 is to lie closer than an inner boundary of second electrode 140.

Preferably, second electrode 140 encloses first electrode 120 on at least three sides. In the representation from FIG. 1, second electrode 140 encloses first electrode 120 on the upper side, the lower side, and the left side. In this case, second electrode 140 forms a U-shaped structure, for example, in the manner of an open polygon. First electrode 120 preferably lies in an area which results when the polygon of second electrode 140 is imagined to be closed.

A convex area 165 may also be formed, first electrode 120 lying completely on the inside of area 165. A geometric figure means convex when the connecting path of any two points belonging to the figure always lies completely in the figure. In the represented specific embodiment, second electrode 140 lies completely on the outside of area 165, although specific embodiments are also conceivable, in which a section of second electrode 140 lies within area 165. It is preferred that the outside of area 165 is at least partially enclosed by sections of second electrode 140. For this purpose, second electrode 140 may be designed in a U-shape or at least partially enclose area 165 along an arbitrary curve. In one further exemplary embodiment, area 165 may be delimited with respect to the surroundings with the aid of doping, a modified material structure, and/or a different physical or chemical composition.

Figure 2:
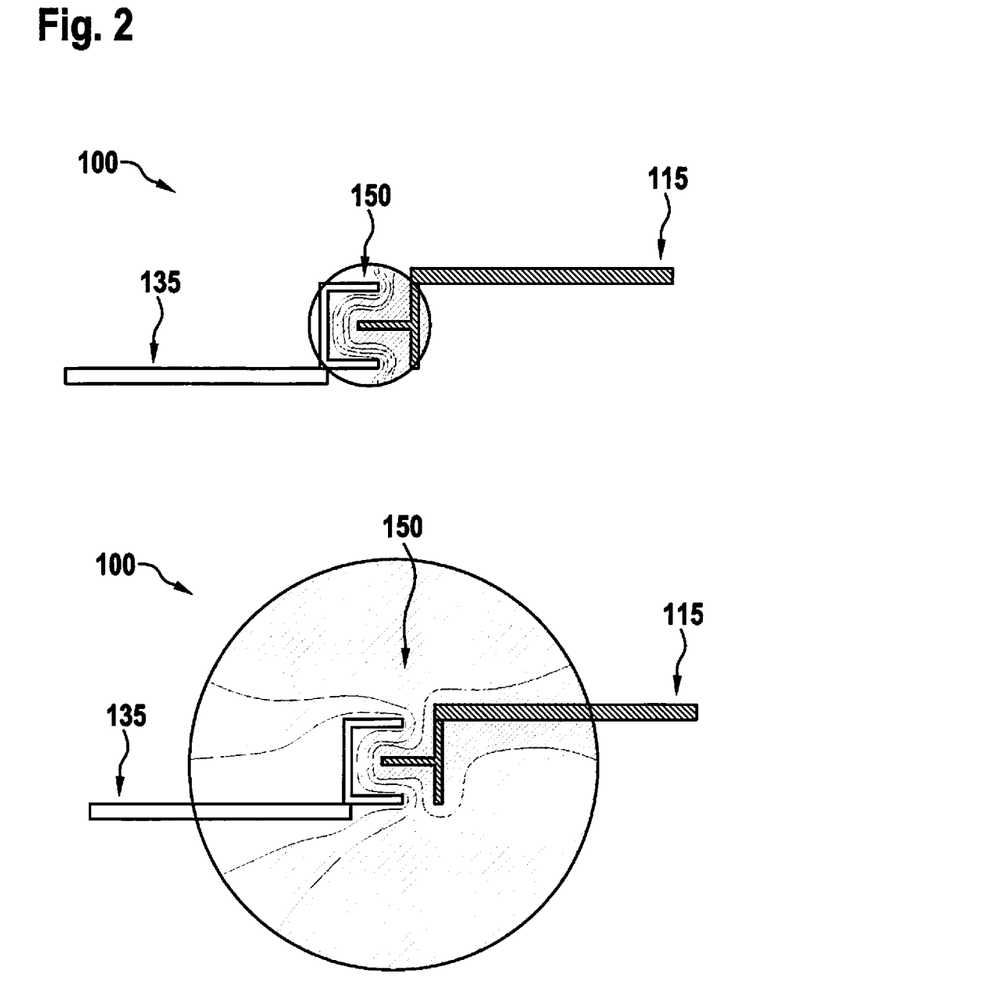
FIG. 2 shows electrical potential lines on a known gas sensor.

FIG. 2 shows electrical potential lines on a known gas sensor 100. Conductor structures 115 and 135 are not insulated with respect to gas-sensitive layer 150. Potential lines on conductor structures 115, 135 when gas-sensitive layer 150 is small are represented in the upper area, and potential lines when gas-sensitive layer 150 is large are represented in the lower area of FIG. 2. It is apparent that, as the size of gas-sensitive layer 150 increases, an influence of the radially outside lying areas of gas-sensitive layer 150 on conductor structures 115, 135 increases. This influence may act electrically in the manner of a resistor connected in parallel between electrodes 120 and 140.

Figure 3:
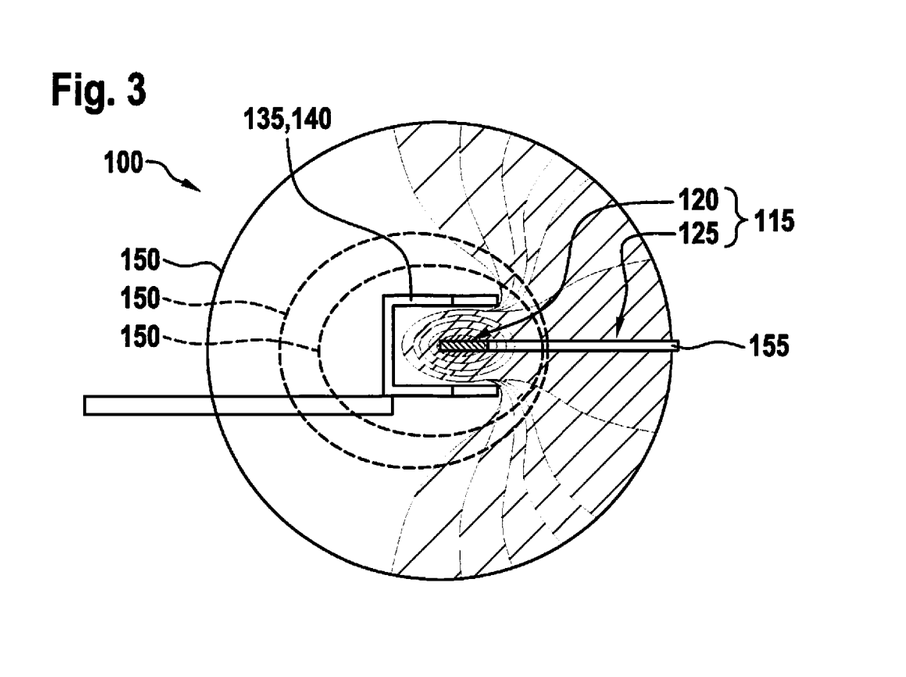
FIG. 3 shows electrical potential lines on a gas sensor from FIG. 1.

FIG. 3 shows electrical potential lines on gas sensor 100 from FIG. 1. In this case, three different possible sizes of gas-sensitive layer 150 are represented. Due to an insulation layer 155, supply line 125 is not electrically directly connected to gas-sensitive layer 150. It is apparent that practically no more potential transitions take place on a radial outer side of second electrode 140, since this area is electrically ineffective between electrodes 120 and 140. In the represented specific embodiment, second conductor structure 135 is completely in contact with gas-sensitive layer 150, so that second supply line 145 is limited to an area beyond the extension of gas-sensitive layer 150 or is dispensed with.

Figure 4:
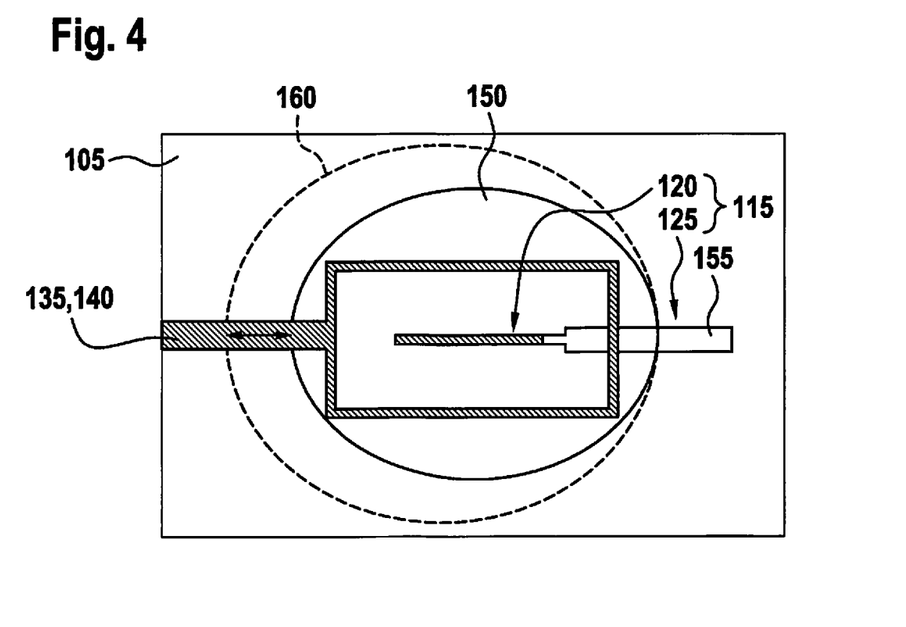
FIG. 4 shows one further specific embodiment of the gas sensor from FIG. 1.

FIG. 4 shows one further specific embodiment of gas sensor 100 from FIG. 1. In this case, second electrode 140 completely encloses first electrode 120 in the plane of carrier membrane 105. An electrical insulation between second electrode 140 and first electrode 120 may take place in an intersection area with the aid of insulation 155.

Figure 5:
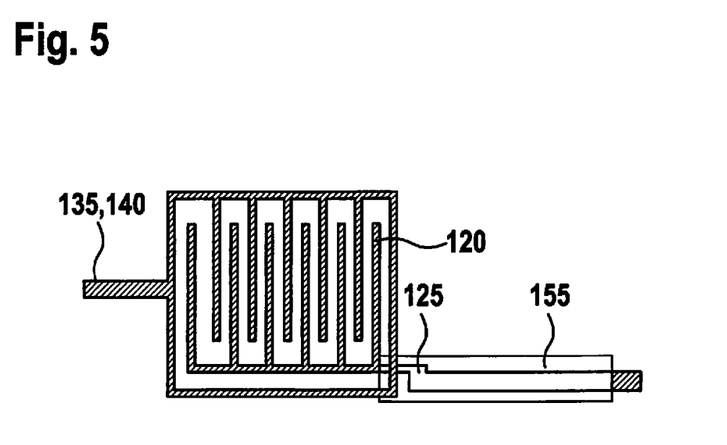
FIGS. 5 through 8 show specific embodiments of arrangements for the gas sensor from FIG. 1.

FIG. 5 shows a first specific embodiment of an arrangement for gas sensor 100 from FIG. 1. Only first conductor structure 115, second conductor structure 135, and insulation 155 are represented. First electrode 120 and second electrode 140 are interlocked in a comb-like manner. The interlocked area is preferably completely enclosed by second electrode 140. In this case, first electrode 120 and second electrode 140 may be insulated with respect to each other once again with the aid of insulation 155. In another specific embodiment, the enclosing section of second electrode 140 may also be open at one point in order to allow first electrode 120 to pass by, without contact, in a plane. As a result, the two electrodes 120, 140 may be applied in one shared process and do not need to be made one after another.

Figure 6:
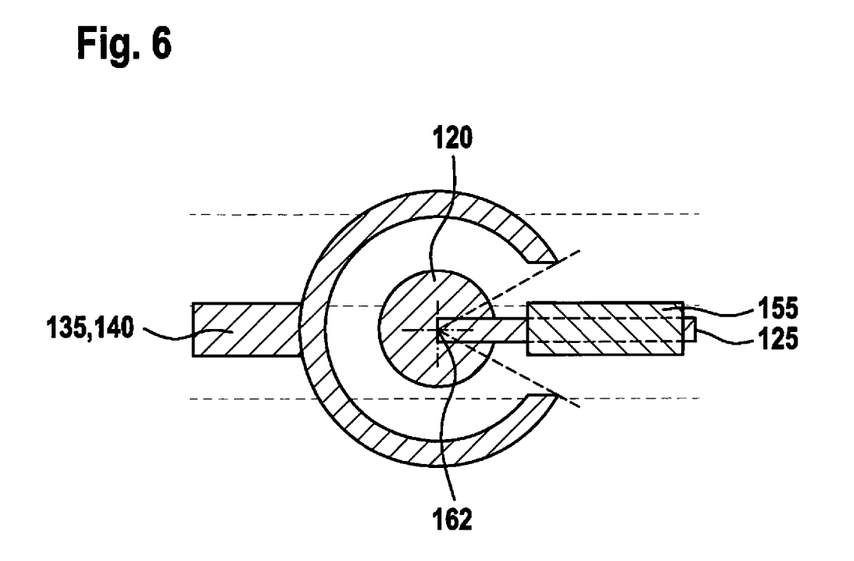

FIG. 6 shows one further arrangement for gas sensor 100 from FIG. 1 according to the example from FIG. 5. In this case, first electrode 120 and second electrode 140 have been designed in an improved manner concentrically with respect to axis 162. In this case, second electrode 140 encloses first electrode 120 by an angle of preferably more than 270°, namely approximately 300° in the represented specific embodiment. The represented opening angle 605 of second electrode 140 with respect to axis 162 is approximately 60° in this case, although it may be selected to be even smaller.

Figure 7:
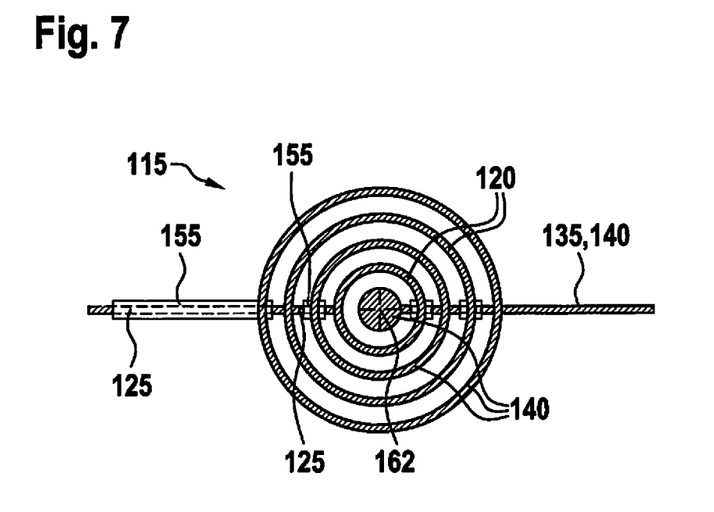

FIG. 7 shows one further specific embodiment of an arrangement for gas sensor 100 according to the representations from FIGS. 5 and 6. In this case as well, a concentric arrangement with respect to axis 162 has been selected, although first electrodes 120 and second electrodes 140 are situated in alternation in the radial direction. The outermost electrode is second electrode 140 in this case. Electrodes 120, 140 are insulated with respect to each other with the aid of insulations 155 at intersection points; in another specific embodiment, a breakthrough may also be present at this point, as shown in the specific embodiments from FIGS. 1 and 6.

Figure 8:
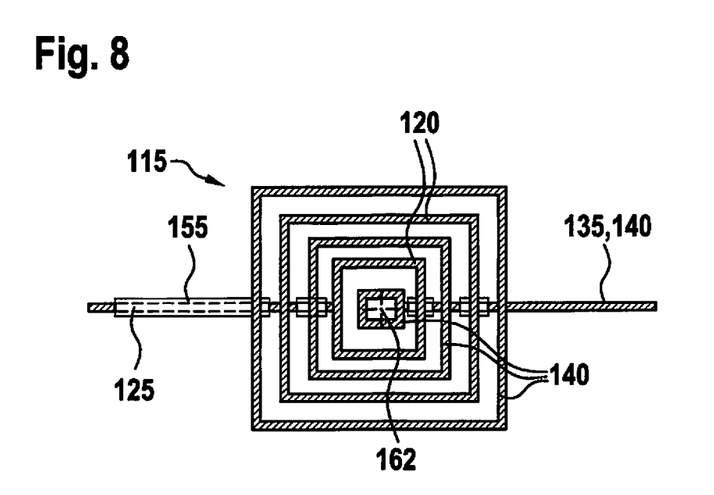

FIG. 8 shows one further specific embodiment of an arrangement for gas sensor 100 from FIG. 1 in dependence on the specific embodiment from FIG. 7. In this case, a square basic shape has been selected instead of a round basic shape.

Figure 9:
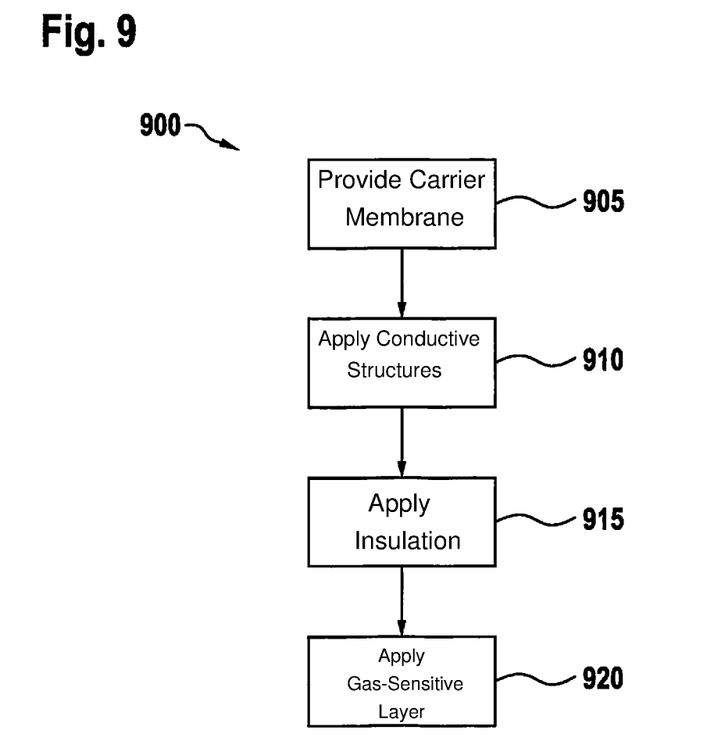
FIG. 9 shows a flow chart of a method for manufacturing a gas sensor.

FIG. 9 shows a flow chart of a method 900 for manufacturing a gas sensor 100.

In a step 905, carrier membrane 105 is provided. Preferably, heating unit 110 has already been mounted on carrier membrane 105 in this case. In a step 910, conductor structures 115 and 135 are applied. In a step 915, the insulation 155 is applied. Parts of conductor structures 115, 135 may also be applied on carrier membrane 105 after the application of insulation 155 in step 915.

Due to the application of insulation 155 in step 915, at least first conductor structure 115 is subdivided into first electrode 120 and first supply line 125. In this case, first electrode 120 is to lie in the manner described above with reference to the other figures, in particular FIG. 1.

In a step 920, gas-sensitive layer 150 is applied on carrier membrane 105 in the area of conductor structures 115, 135. The application of gas-sensitive layer 150 may take place, for example, via spraying, stamping, printing, or brushing on a liquid or paste-like compound which may subsequently cure. This step may be subject to an elevated geometric inaccuracy, so that the applied gas-sensitive layer 150 possibly varies in terms of position, size, or alignment with respect to carrier membrane 105. Provided it is ensured in step 920 that gas-sensitive layer 150 extends at least in an area in the plane of carrier membrane 105, which lies between electrodes 120 and 140, these variations may have no influence or no decisive influence on the sampling behavior of gas sensor 100. In particular, the sensitivity, selectivity, or response time of gas sensor 100 may be uninfluenced by the areas of gas-sensitive layer 150 lying radially outside second electrode 140.

What is claimed is:

1. A gas sensor, comprising:
   a planar carrier membrane;
   a gas-sensitive layer on the carrier membrane;
   a first electrode and at least a second electrode, wherein each one of the first and the second electrodes lie on the gas-sensitive layer in an electrically conductive manner;
   a first electrical supply line to the first electrode;
   a second electrical supply line to the second electrode; and
   a heating unit on the carrier membrane;
   wherein at least a first conductor structure, which includes the first electrode and the first electrical supply line, is mounted on the carrier membrane;
   wherein the first electrode is a section of the first conductor structure, which is in electrical contact with the gas-sensitive layer, and wherein the second electrode is a section of the second conductor structure, which is in electrical contact with the gas-sensitive layer,
   wherein the gas-sensitive layer includes a metal oxide layer,
   wherein the second electrode lies radially outside the first electrode,
   wherein the first electrical supply line is insulated with respect to the gas-sensitive layer because a section of the first conductor structure does not contact the gas-sensitive layer as it is electrically insulated therefrom with insulation,
   wherein the second conductor structure, including the second electrode and a second supply line, is mounted on the carrier membrane, and wherein the second electrode is a section of the second conductor structure, which is in electrical contact with the gas-sensitive layer, wherein the first and second electrodes are situated on the carrier membrane so that a section of the gas-sensitive layer, which lies within a variance range, which is a range between a minimum possible size of the gas-sensitive layer and a maximum possible size has essentially no influence on an electrical measurement with respect to the first and second electrodes.

2. The gas sensor as recited in claim 1, wherein the first supply line is insulated with respect to the gas-sensitive layer in a vertical direction by an insulation layer.

3. The gas sensor as recited in claim 1, wherein a convex area lies in a plane of the carrier membrane, wherein the first electrode is limited to an inner side of the convex area, and wherein the second electrode lies on at least three sides of an outer side.

4. The gas sensor as recited in claim 1, wherein the second electrode encloses the first electrode in a plane of the carrier membrane by an angle of at least 270°.

5. The gas sensor as recited in claim 1, wherein an electrically effective area of the gas-sensitive layer lying between the first and the second electrodes is limited to an inner area of the second electrode.

6. The gas sensor as recited in claim 1, wherein the first and the second electrodes are interlocked in a comb-like manner on a radial inner side of the second electrode.

7. The gas sensor as recited in claim 1, wherein the first electrode is separated from the second electrode, at some points, by an insulation.

8. The gas sensor as recited in claim 1, wherein at least one of the first supply line and the second supply line is separated from the gas-sensitive layer by an insulation.

9. A method for manufacturing a gas sensor, the method comprising:

providing a planar carrier membrane;

applying a first conductor structure and a second conductor structure;

applying an insulation of a section of the first conductor structure so that the second conductor structure lies radially outside an uninsulated section of the first conductor structure; and applying a gas-sensitive layer onto the carrier membrane in an uninsulated area of the first and the second conductor structures; and providing a heating unit on the carrier membrane;

wherein at least a first conductor structure, which includes the first electrode and a first electrical supply line, is mounted on the carrier membrane;

wherein the first electrode is a section of the first conductor structure, which is in electrical contact with the gas-sensitive layer, and wherein the second electrode is a section of the second conductor structure, which is in electrical contact with the gas-sensitive layer, wherein the gas-sensitive layer includes a metal oxide layer, wherein the first electrical supply line is insulated with respect to the gas-sensitive layer because a section of the first conductor structure does not contact the gas-sensitive layer as it is electrically insulated therefrom with insulation, wherein the second conductor structure, including the second electrode and a second supply line, is mounted on the carrier membrane, and wherein the second electrode is a section of the second conductor structure, which is in electrical contact with the gas-sensitive layer, wherein the first and second electrodes are situated on the carrier membrane so that a section of the gas-sensitive layer, which lies within a variance range, which is a range between a minimum possible size of the gas-sensitive layer and a maximum possible size has essentially no influence on an electrical measurement with respect to the first and second electrodes.

* * * * *